Hocker et al.
[11] 3,792,245
[45] Feb. 12, 1974

[54] DOUBLE-SCALED AUTOCORRELATOR

[75] Inventors: Lon Hocker, Newton; Irl W. Smith, Jr., Cambridge, both of Mass.

[73] Assignee: Massachusetts Institute of Technology, Cambridge, Mass.

[22] Filed: Aug. 21, 1972

[21] Appl. No.: 282,649

[52] U.S. Cl. .......... 235/181, 235/150.53, 324/77 H
[51] Int. Cl. .......... G06f 15/34, G06g 7/19
[58] Field of Search 235/181; 343/100 CL; 324/77 G, 324/77 H

[56] References Cited

UNITED STATES PATENTS

| | | | |
|---|---|---|---|
| 3,495,077 | 2/1970 | Hiltz et al. | 235/181 |
| 3,689,750 | 9/1972 | Esser | 235/181 |
| 3,680,100 | 7/1972 | Woerrlein | 343/100 CL |
| 3,555,258 | 1/1971 | Berthier et al. | 235/181 |
| 3,036,775 | 5/1962 | McDermid et al. | 235/181 |

*Primary Examiner*—Felix D. Gruber
*Attorney, Agent, or Firm*—Arthur A. Smith; Robert Shaw

[57] ABSTRACT

A double-scaled autocorrelator which includes means for eliminating spurious correlations which occur in the system because of the double scaling. The autocorrelator system includes a pulse shaper to receive an incoming signal. In one system, the pulse shaper is connected to a pulse processor comprising a single presettable scaler which is preset each clock period by a random court generator, thereby removing spurious correlations. In another system, the pulse shaper is connected to a pulse processor comprising two phase-independent scalers to perform that function. The system contains a shift register connected to receive as one input the output of the scaler (or the first of the two scalers), the output of each unit of the shift register being connected as an input to a clocked multiplier another input to which is derived from the scaler (or the second of the two scalers). The system further includes a plurality of counters, each to receive as an input an output from one of the multipliers. Furthermore, the system may include provision to subtract from each counter the input to the last counter, and it may include provision for clocking the channels at successively slower rates.

13 Claims, 9 Drawing Figures

DOUBLE-SCALED AUTOCORRELATOR

The invention herein described was made in part under a contract with the U.S. Department of Defense, Advanced Research Project Agency.

The present invention relates to autocorrelators and, in particular, to double-scaled autocorrelators.

A pulse autocorrelator is a device which measures the probability of a pulse arriving at a particular time given the arrival of a pulse at a distinct time prior to the particular time. This probability is usually expressed in terms of the so-called autocorrelation function $C(\tau)$ of the input signal $f(t_i)$ where $f(t_i)$ is the number of pulses which arrive between time $t_i$ and time $t_{i+1}$. The definition of $C(\tau)$ is $$C(\tau)=\sum_i f(t_i)f(t_i+\tau).$$

The autocorrelation function $C(\tau)$ measures the average time behavior of $f(t)$ in the same way as does the power spectral density $S(\omega)$ of $f(t)$. In fact, $$S(\omega)=\int_0^\infty C(\tau)\cos\omega\tau d\tau.$$

To reduce to a usable number the large number of pulses usually provided as inputs to such devices, the number of pulses applied to the time-delayed channel of the device is usually either scaled or clipped. Scaling of one channel, however, does not reduce the input pulses optimally; nor does clipping reduce the pulses optimally and, sometimes, clipping introduces error signals. Double clipping does reduce the signal nearly optimally but introduces unacceptable spurious correlations. Previously, double scaling was not used because it was thought it would also introduce unacceptable spurious correlations, but the present invention, as hereinafter noted, eliminates the latter problem.

Accordingly, an object of the present invention is to provide a double-scaled autocorrelator in which the spurious correlations caused by double scaling are eliminated.

A further object is to provide a double-scaled autocorrelator in which the input pulses which are reduced in number by double scaling are further reduced by offset devices.

A still further object is to provide a double-scaled autocorrelator which includes a plurality of subtractors connected in the system in such a manner that the input to each counter of the system has subtracted therefrom the input to the last counter.

Another object is to provide a double-scaled autocorrelator that includes provision for clocking the channels of the system at successively slower rates.

These and still further objects are apparent in the description that follows and are particularly delineated in the appended claims.

The objects of the invention are broadly attained by a double-scaled autocorrelator that includes, in combination, a pulse shaper to receive an input signal; a pulse processor connected to receive as input thereto the output of the pulse shaper and having a first and a second output, said pulse processor having means to eliminate the spurious correlation between the first and second outputs due to double scaling; a shift register having successive outputs, connected to receive as an input thereto the first output from the pulse processor; a plurality of multipliers each connected to receive as a first input thereto the second output from the pulse processor and to receive as a second input thereto one of the successive outputs from the shift register; and a plurality of counters each to receive as an input thereto an output from the corresponding multiplier of the plurality of multipliers.

The invention is hereinafter described with reference to the accompanying drawing in which.

Figure 1:
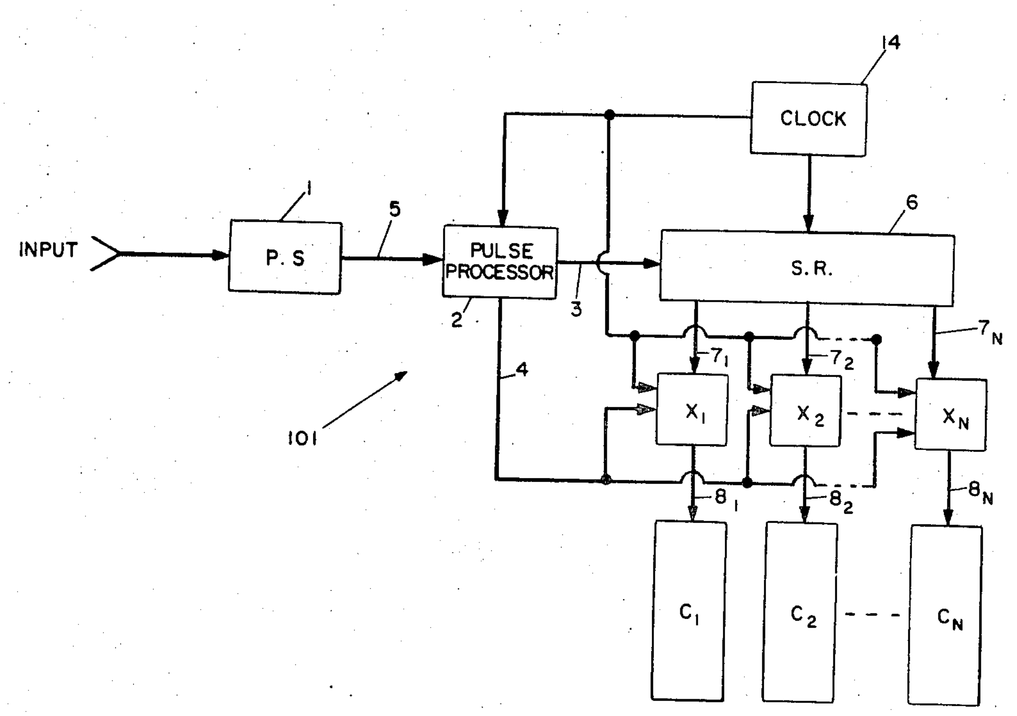
FIG. 1 is a schematic,in block diagram form, of a doublescaled autocorrelator embodying the present inventive concepts and including a pulse processor.
Figure 8:
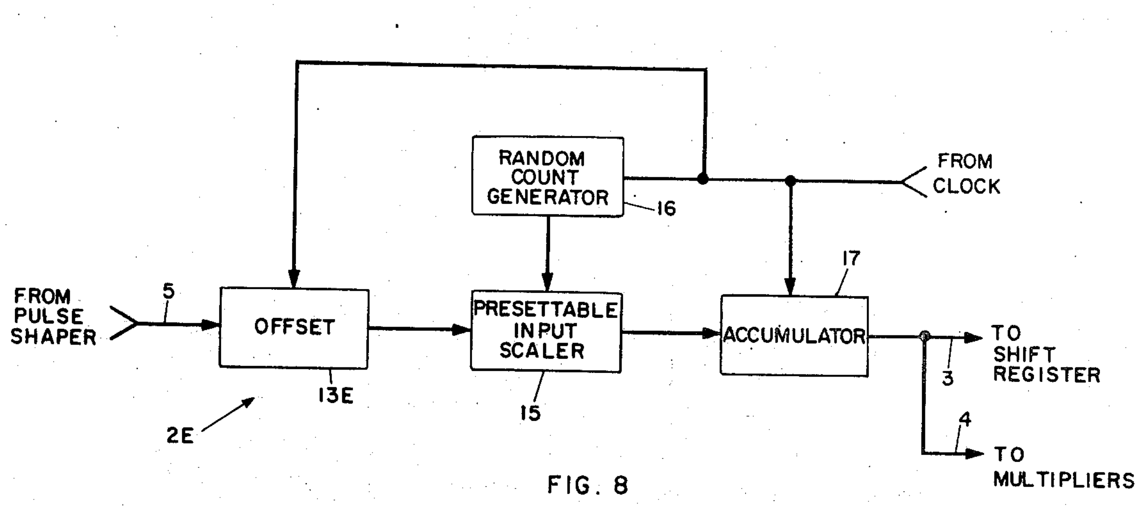
Figure 9:
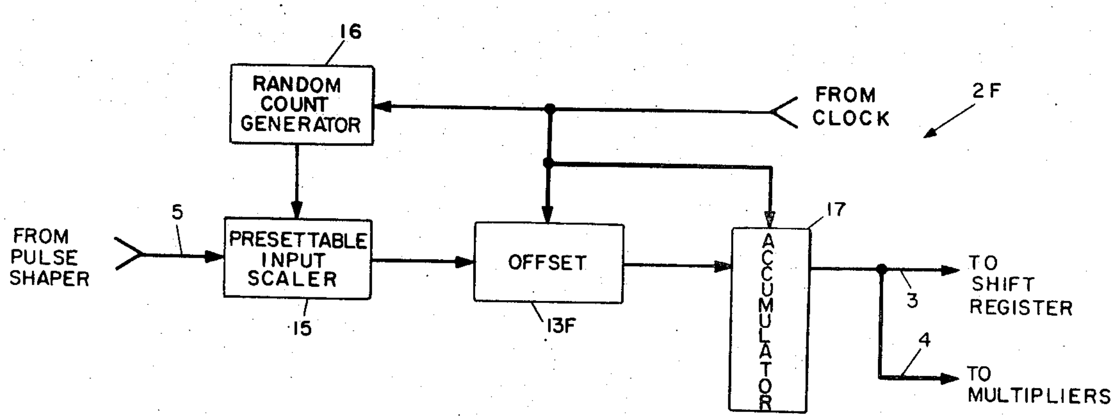

FIG. 8 is a schematic, in block diagram form, of a pulse processor for a double-scaled autocorrelator like the autocorrelator of FIG. 1, and includes a presettable input scaler and a random count generator, the scaler being preceded by an offset; and FIG. 9 is a schematic, in block diagram form of a pulse processor for a double-scaled autocorrelator like the autocorrelator of FIG. 1, and includes a presettable input scaler and a random count generator, the scaler being connected through an offset to an accumulator.

Turning now to FIG. 1, a double-scaled autocorrelator embodying the present inventive concepts is shown at 101. The autocorrelator 101 includes a pulse shaper 1 to receive an input signal. A pulse processor 2 is connected to receive as input 5 thereto the output of the pulse shaper 1 and has a first output 3 and a second output 4. The pulse processor may take several different forms (as is discussed in connection with FIGS. 4,5,6,7,8 and 9 wherein the pulse processors shown are designated 2A, 2B, 2C, 2D, 2E, and 2F, respectively), but in whatever form the processor appears its function, among other things, is to eliminate the spurious correlation that occurs between the first and second outputs due to double scaling. A shift register 6, having successive outputs $7_1, 7_2 \ldots 7_N$, is connected to receive as one input thereto the first output 3 of the pulse processor 2. Each of a plurality of multipliers $X_1, X_2 \ldots X_N$ is connected to receive as a first input thereto the second output 4 of the pulse processor 2 and to receive as a second input thereto the successive outputs $7_1, 7_2 \ldots 7_N$, respectively, of the shift register 6. A plurality of counters $C_1, C_2 \ldots C_N$ is connected so that each receives as an input thereto an output from the corresponding multiplier of the plurality of multipliers, that is, the counters $C_1, C_2 \ldots C_N$ are connected to the outputs designated $8_1, 8_2 \ldots 8_N$, respectively, of the multipliers $X_1, X_2 \ldots X_N$, respectively.

Figure 4:
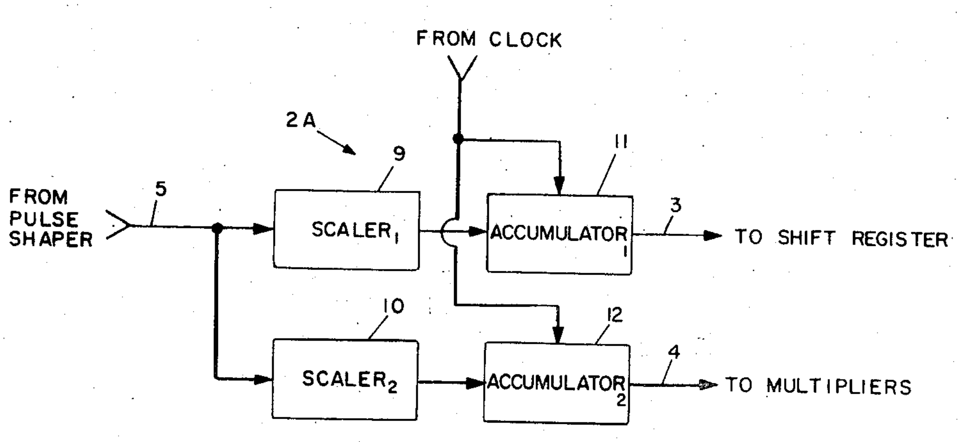
FIG. 4 is a schematic, in block diagram form, of a pulse processor for a double-scaled autocorrelator, like the autocorrelator of FIG. 1, and includes two independent scalers.
Figure 6:
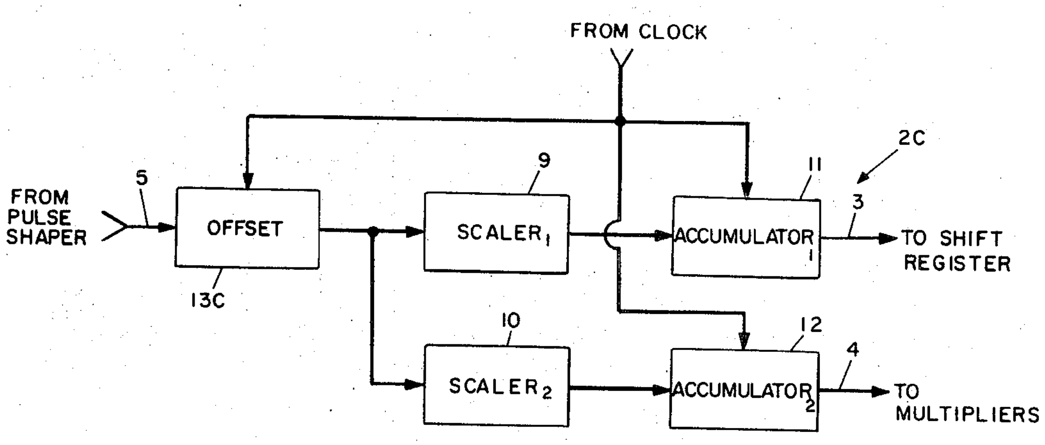
FIG. 6 is a schematic, in block diagram form, of a pulse processor for a double-scaled autocorrelator, like the autocorrelator of FIG. 1, and includes two independent scalers preceded by an offset.
Figure 7:
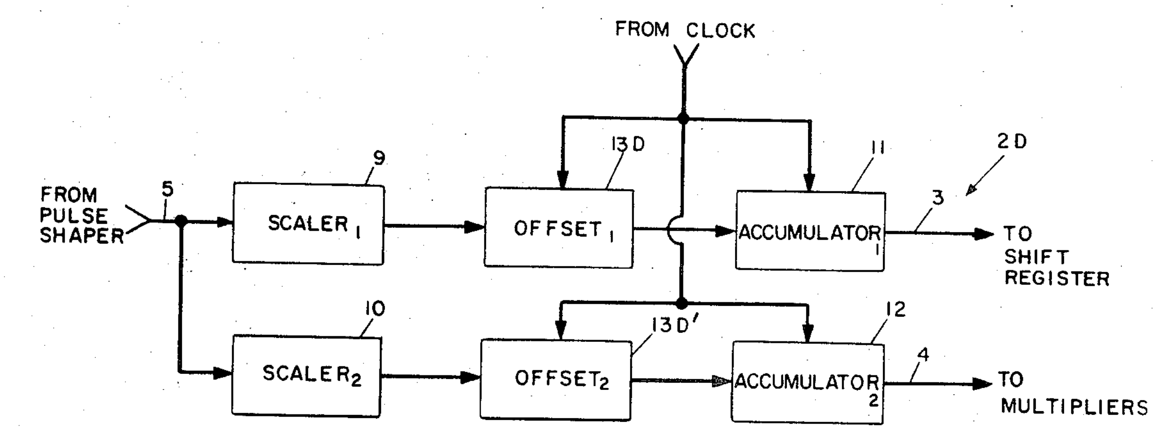
FIG. 7 is a schematic, in block diagram form, of a pulse processor for a double-scaled autocorrelator, like the autocorrelator in FIG. 1, and includes two independent scalers respectively connected through offsets to associated accumulators.

The means in the pulse processor to eliminate spurious correlations takes two forms. The first form ,as shown in FIGS. 4, 6, and 7 ,contains first and second phase-independent scalers 9 and 10, respectively, the phase independence of the two scalers being assured by the use of different scale factors. A first accumulator 11 is connected to receive as input the output of the first scaler 9 and has as output the first output 3 of the processor; a second accumulator 12 is connected to receive as input the output of the second scaler 10 and has as output the second output 4 of the processor. (The input and the two outputs of the pulse processors herein are assigned the same numeral designation throughout this specification.)

The processor 2C in FIG. 6 includes an offset device 13C having its input connected to the output of the pulse shaper and having two outputs, one of the outputs being connected as input to the first scaler 9 and the other of the outputs being connected as input to the second scaler 10. The offset 13C has zero output from the time it is initialized until a predetermined number of pulses has been applied to its input, and it passes all subsequent pulses until it is re-initialized. The offset device 13C , the first scaler 9, and the second scaler 10 act in combination to present to the shift register 6 and the multipliers $X_1, X_2 \ldots X_N$ an input $R$ which relates to the input $I$ to the pulse shaper in the following manner:

$$R = (I - D)/S,$$

where $D$ is the number subtracted by the offset device and $S$ is the scale factor of the particular scaler, or $$R = (I/S) - D,$$

depending upon whether the offset device is connected in the circuit ahead of the scalers as shown in FIG. 6 or following the scalers, as shown in FIG. 7 (and as later discussed). In FIG. 6 one offset device is shown. It should also be pointed out that a clock 14 in FIG. 1 serves to effect proper timing of the offsets, accumulators and shift registers herein discussed.

Mention is made above of the possibility of placing the offset means behind the scalers and this is done in the circuitry represented in FIG. 7 wherein the pulse processor 2D is shown having first and second offsets 13D and 13D', respectively. The offset 13D has as its input the output of the first scaler 9 and has its output connected as input to the first accumulator 11. The offset 13D' has as its input the output of the second scaler 10 and has its output connected as input to the second accumulator 12.

Figure 5:
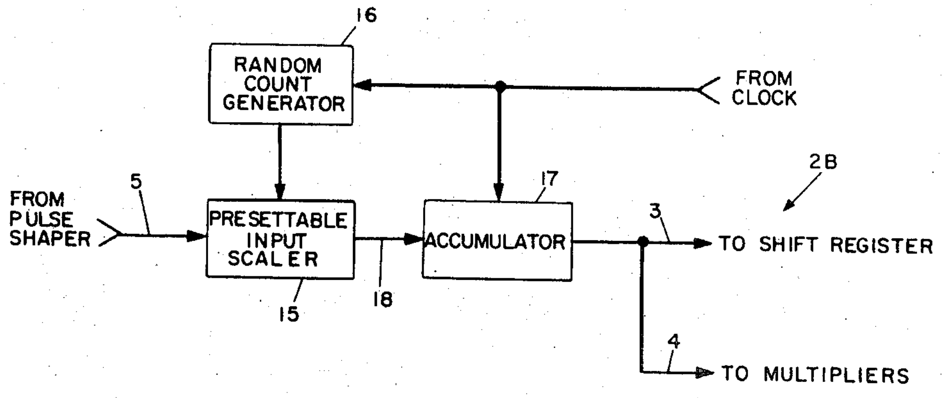
FIG. 5 is a schematic, in block diagram form, of a pulse processor for a double-scaled autocorrelator, like the autocorrelator of FIG. 1, and includes a presettable input scaler and a random-count generator.

The second form of pulse processor is shown in FIGS. 5, 8 and 9. The pulse processor 2B in FIG. 5 comprises a presettable input scaler 15 connected to receive as input the output of the pulse shaper 1. The means for eliminating spurious correlation due to double scaling is a random count generator 16 connected to preset the input scaler 15 and adapted to preset the input scaler 15 when it is clocked. The output of the scaler 15 is connected as input to an accumulator 17 which has as identical outputs the first and second outputs 3 and 4 of the pulse processor. The pulse processor 2E in FIG. 8 has an offset 13E, like the offset 13C, connected to receive as input the output of the pulse shaper 1 and has its output connected to the scaler 15. Thus, the offset 13E, which precedes the scaler, acts in the same manner as the offset 13C above mentioned. In FIG. 9 the offset shown at 13F has as its input the output of the scaler 15 and has its output connected as input to the accumulator 17. Thus, the offset 13F acts similarly to the offsets 13D and 13D' above mentioned.

Figure 2:
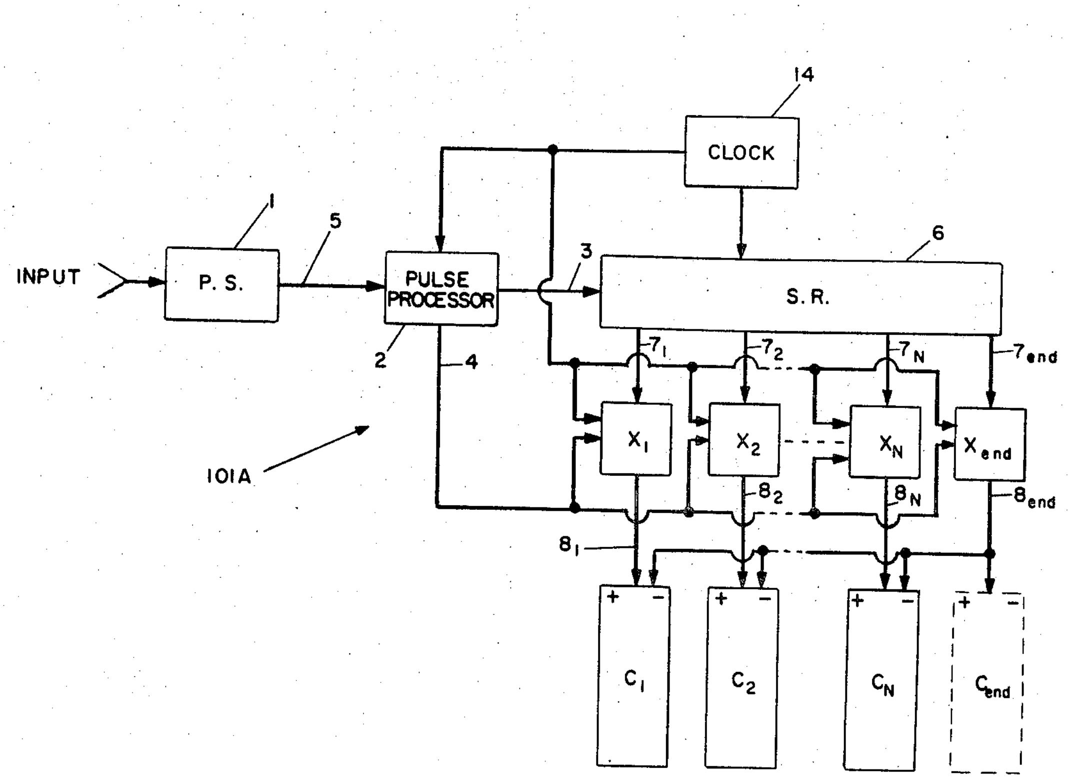
FIG. 2 is a schematic, in block diagram form, of an autocorrelator similar to that of FIG. 1 but having a lastchannel subtractor.

The double-scaled autocorrelator shown at 101A in FIG. 2 includes a last-channel subtractor that comprises means to subtract the input to the last counter $C_{end}$ of the plurality of counters from the input to the other counters $C_1, C_2 \ldots C_N$. This is accomplished by providing a further multiplier designated $X_{end}$ to receive an input from the shift register 6 by a conductor $7_{end}$. The multiplier $X_{end}$ has an output $8_{end}$ which is the input to the last counter $C_{end}$. In fact, the counter $C_{end}$ is not needed in the circuit; its input, (i.e., the output $8_{end}$), however, can be subtracted from all the other counters, as mentioned, to reduce the count on each of the counters. The same result can be accomplished by subtracting the signal on the lead $7_{end}$ from the inputs $7_1, 7_2 \ldots 7_N$ to each of the multipliers $X_1, X_2 \ldots X_N$.

Figure 3:
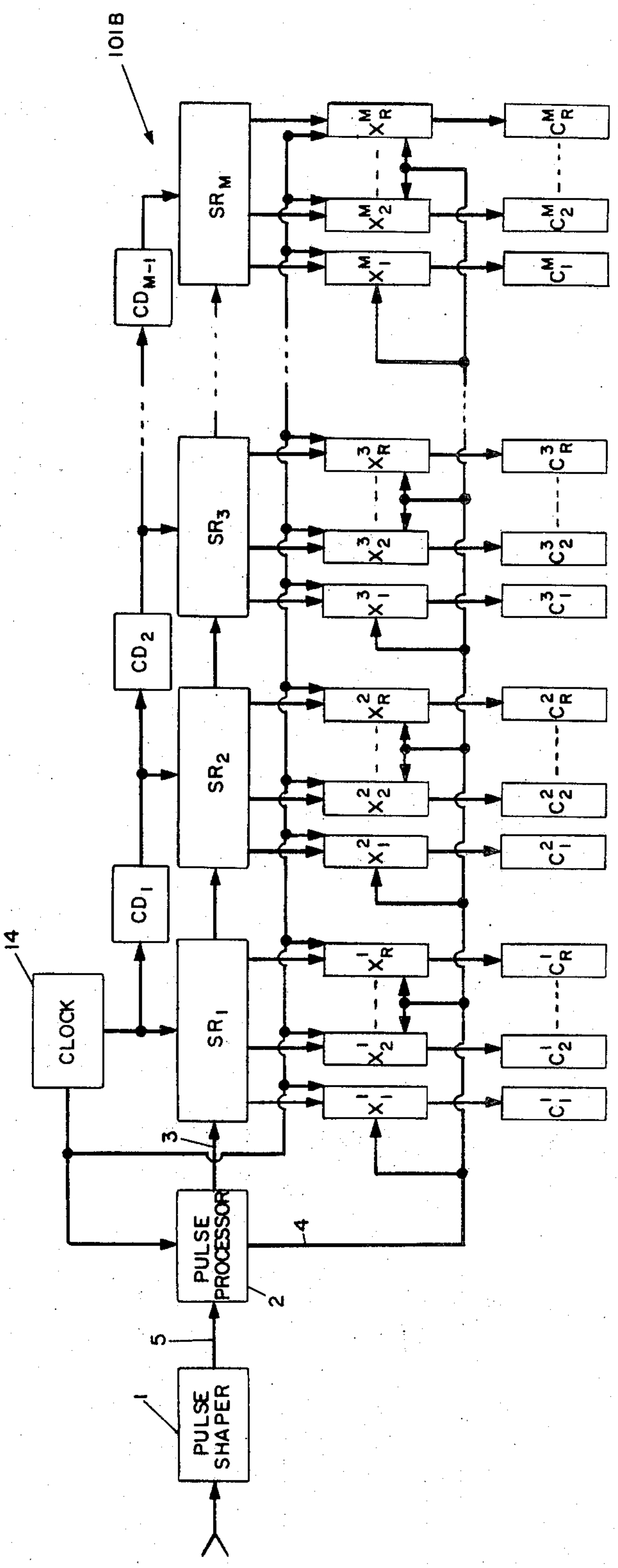
FIG. 3 is a schematic, in block diagram form, of a doublescaled autocorrelator with a pulse processor and a plurality of clock-divider circuits.

In the double-scaled autocorrelator shown at 101B in FIG. 3, the shift register comprises a plurality of sub-registers $SR_1, SR_2, SR_3 \ldots SR_M$ connected in cascade. The autocorrelator 101B includes a plurality of divider circuits $CD_1, CD_2 \ldots CD_{M-1}$, the output of the clock 14 being connected as an input to the clock input of the first sub-register $SR_1$ of the cascade of sub-registers and as input to the first divider circuit $CD_1$ of the plurality of divider circuits. The first divider circuit $CD_1$ has its output connected to the clock input of the second sub-register $SR_2$ of the cascade of sub-registers and also as an input to the second divider circuit $CD_2$ of the plurality of divider circuits. Each succeeding divider circuit has as its input the output of the next preceding divider circuit and has its output connected to the clock input of the next successive sub-register of the cascade of sub-registers as shown, and to the next divider circuit of the plurality of divider circuits, except for the last divider circuit $CD_{m-1}$ which has no succeeding divider circuit. The divider circuits are operable to divide by any number of a set of numbers, including one.

Modifications of the present invention will occur to persons skilled in the art and all such modifications are deemed to be within the spirit and scope of the invention defined by the appended claims.

What is claimed is:

1. A double-scaled autocorrelator that comprise in combination: a pulse shaper to receive an input signal; a pulse processor connected to receive as input thereto the output of the pulse shaper and having a first output and a second output, said pulse processor being operable to eliminate the spurious correlation that arises between the first and second outputs due to double scaling; a shift register having successive outputs, connected to receive as an input thereto the first output from the pulse processor; a plurality of multipliers each connected to receive as a first input thereto the second output from the pulse processor and to receive as a second input thereto the corresponding successive outputs from the shift register; a plurality of counters each to receive as an input thereto an output from its corresponding multiplier and the plurality of multipliers; and a clock connected to effect proper timing of the cooperative elements of the autocorrelator.

2. A double-scaled autocorrelator as claimed in claim 1 in which the pulse processor comprises a first scaler connected to receive as input thereto the output of the pulse shaper, a first accumulator connected to receive as input the output of the first scaler and having as output the first output of the pulse processor, a second scaler connected to receive as input the output of the pulse shaper, and a second accumulator connected to receive as input the output of the second scaler and having as output the second output of the pulse processor, the two scalers having different scale factors to assure phase independence.

3. A double-scaled autocorrelator as claimed in claim 2 in which the pulse processor has an offset connected to receive as input the output of the pulse shaper and having two outputs, one output of the offset being connected as input to the first scaler and the other output of the offset being connected as input to the second scaler, which offset has zero output from the time it is initialized until a number of pulses has been applied to its input and which passes all subsequent pulses until it is re-initialized.

4. A double-scaled autocorrelator as claimed in claim 2 in which the pulse processor has first and second offsets, one offset having as input the output of the first scaler and having its output connected as input to the first accumulator and the other offset having as input the output of the second scaler and having its output connected as input to the second accumulator, each offset having zero output from the time it is initialized until a number of pulses has been applied to its input and passing all subsequent pulses until it is re-initialized.

5. A double-scaled autocorrelator as claimed in claim 1 in which the pulse processor comprises a presettable input scaler connected to receive as input the output of the pulse shaper, the spurious correlation due to double scaling being eliminated by a random count generator connected to preset the input scaler and adapted to the preset the input scaler whenever the random-count generator is clocked; and an accumulator having as input the output of the presettable input scaler and having as identical outputs the first and second outputs of the pulse processor.

6. A double-scaled autocorrelator as claimed in claim 5 having an offset connected to receive as input the output of the pulse shaper and having its output connected as input to the scaler,which offset has zero output from the time it is initialized until a number of pulses has been applied to its input, and which passes all subsequent pulses until it is re-initialized.

7. Apparatus as claimed in claim 5 with an offset having as its input the output of the scaler and having its output connected as input to the accumulator, said offset having zero output from the time it is initialized until a predetermined number of pulses has been applied to its input and which passes all subsequent pulses until it is re-initialized.

8. A double-scaled autocorrelator as claimed in claim 1 that further includes a last-channel subtractor comprising means to subtract the output of the last multiplier of the plurality of multipliers form the input to all counters of the plurality of counters.

9. Apparatus as claimed in claim 1 having a last-channel subtractor comprising means to subtract the second input to the last multiplier of the plurality of multipliers from the second input to all the other multipliers thereof.

10. A double-scaled autocorrelator as claimed in claim 1 in which the shift register comprises a plurality of sub-registers connected in cascade and wherein said clock is connected to a clock input of each sub-register.

11. A double-scaled autocorrelator as claimed in claim 10 which includes a plurality of divider circuits, the output of the clock being connected as an input to the clock input of the first sub-register of the cascade of the sub-registers and as input to the first divider circuit, said divider circuit having its output connected to the clock input of the second sub-register of the cascade of sub-registers and also as input to the second divider circuit of the plurality of divider circuits, each successive divider circuit of the plurality of divider circuits each having as its input the output of the next preceding divider circuit and having its output connected to the clock input of the next successive sub-register of the cascade of sub-registers and, except for the last divider circuit of the plurality of divider circuits, as input to the next divider circuit of the plurality of divider circuits.

12. A double-scaled autocorrelator as claimed in claim 11 in which the divider circuits are operable to divide by any number of a set of numbers, including one.

13. A double-scaled autocorrelator that comprises, in combination: a pulse processor connected to receive an input signal and having a first output and a second output, said pulse processor being operable to eliminate the spurious correlation between the first output and the second output due to double scaling; a shift register having successive outputs, connected to receive as an input thereto the first output from the pulse processor; a plurality of multipliers each connected to receive as a first input thereto the second output from the pulse processor and to receive as a second input thereto the corresponding successive outputs from the shift register; a plurality of counters each to receive as an input thereto an output from its corresponding multiplier of the plurality of multipliers; and a clock connected in the circuit of the autocorrelator to effect proper timing of the interacting elements of the combination.

* * * * *